US010502189B2

United States Patent
Baun et al.

(10) Patent No.: US 10,502,189 B2
(45) Date of Patent: Dec. 10, 2019

(54) METHODS FOR ERECTING OR DISMANTLING A MULTIROTOR WIND TURBINE

(71) Applicant: Vestas Wind Systems A/S, Aarhus N. (DK)

(72) Inventors: Torben Ladegaard Baun, Skødstrup (DK); Jesper Lykkegaard Neubauer, Hornslet (DK); Gunnar K. Storgaard Pedersen, Skjern (DK); Erik Carl Lehnskov Miranda, Randers Sv (DK)

(73) Assignee: Vesta Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/744,277

(22) PCT Filed: Jul. 14, 2016

(86) PCT No.: PCT/DK2016/050249
§ 371 (c)(1),
(2) Date: Jan. 12, 2018

(87) PCT Pub. No.: WO2017/008818
PCT Pub. Date: Jan. 19, 2017

(65) Prior Publication Data
US 2018/0202418 A1    Jul. 19, 2018

(30) Foreign Application Priority Data

Jul. 16, 2015  (DK) .................... 2015 70474

(51) Int. Cl.
*F03D 13/10*    (2016.01)
*F03D 1/02*    (2006.01)
*F03D 13/20*    (2016.01)

(52) U.S. Cl.
CPC ............... *F03D 13/10* (2016.05); *F03D 1/02* (2013.01); *F03D 13/20* (2016.05); *F03D 13/22* (2016.05);
(Continued)

(58) Field of Classification Search
CPC . F03D 1/02; F03D 13/10; F03D 13/20; F03D 13/22; F03D 2230/604;
(Continued)

(56) References Cited

U.S. PATENT DOCUMENTS 2,388,377 A * 11/1945 Albers ................ F03D 7/02
290/55
2,511,023 A *  6/1950 Thomas ............. F03D 13/20
52/40

(Continued)

FOREIGN PATENT DOCUMENTS

CN    103726992 A    4/2014
DE      830180 C    1/1952
(Continued)

OTHER PUBLICATIONS

Danish Patent and Trademark Office, Examination and Search Report in PA 2015 70474, dated Feb. 16, 2016.
(Continued)

*Primary Examiner* — James M Ference
(74) *Attorney, Agent, or Firm* — Wood Herron & Evans LLP

(57) ABSTRACT

A method for erecting a multirotor wind turbine (10) is disclosed. A carrier structure (1, 1a, 1b) is arranged circumferentially with respect to a tower structure (2) and hoisted to an upper part of the tower structure (2), using a hoisting arrangement, such as a wire winch arrangement (3, 4, 8). Furthermore, energy generating units (5) may be hoisted to the carrier structure (1, 1a, 1b) using the hoisting arrange-
(Continued)

ment (3, 4, 8). A similar method for dismantling a multirotor wind turbine (10) is also disclosed. The multirotor wind turbine (10) can be erected or dismantled without the need for an external crane.

23 Claims, 10 Drawing Sheets

(52) U.S. Cl.
CPC ..... *F05B 2230/604* (2013.01); *F05B 2230/70* (2013.01); *Y02E 10/721* (2013.01); *Y02E 10/728* (2013.01); *Y02P 70/523* (2015.11)

(58) Field of Classification Search
CPC . F03D 2230/70; Y02E 10/721; Y02E 10/728; Y02P 70/523
See application file for complete search history.

(56) References Cited

U.S. PATENT DOCUMENTS

| | | | | |
|---|---|---|---|---|
| 4,110,631 | A * | 8/1978 | Salter | F03D 1/02 290/55 |
| 4,183,717 | A * | 1/1980 | Yamada | F03D 1/02 416/121 |
| 4,272,929 | A * | 6/1981 | Hanson | E02D 27/42 52/40 |
| 4,311,434 | A * | 1/1982 | Abe | B66C 23/207 416/142 |
| 4,550,259 | A * | 10/1985 | Bertels | F03D 1/0608 290/44 |
| 4,786,235 | A * | 11/1988 | Van der Veken | F03D 1/02 416/121 |
| 5,062,765 | A * | 11/1991 | McConachy | F03D 13/20 415/4.3 |
| 5,146,096 | A * | 9/1992 | McConachy | F03D 13/20 290/44 |
| 5,182,458 | A * | 1/1993 | McConachy | F03D 13/20 290/55 |
| 5,429,480 | A * | 7/1995 | Van Der Veken | F03D 80/70 416/120 |
| 5,520,505 | A * | 5/1996 | Weisbrich | F03D 1/04 415/4.1 |
| 5,876,181 | A * | 3/1999 | Shin | F03D 1/06 415/2.1 |
| 6,408,575 | B1 * | 6/2002 | Yoshida | E04H 12/34 52/40 |
| 6,470,645 | B1 * | 10/2002 | Maliszewski | E04H 12/085 52/745.18 |
| 6,505,785 | B2 * | 1/2003 | Willis | E02D 27/42 290/55 |
| 6,979,175 | B2 * | 12/2005 | Drake | F03D 1/00 416/11 |
| 8,353,141 | B2 * | 1/2013 | Berg | E02B 17/0818 52/745.04 |
| 8,950,127 | B2 * | 2/2015 | Yakoub | F03D 9/255 52/173.1 |
| 9,016,029 | B2 * | 4/2015 | Wagner | E04H 12/342 52/745.18 |
| 9,120,652 | B2 * | 9/2015 | Munk-Hansen | B66C 23/18 |
| 2001/0038207 | A1 * | 11/2001 | Willis | F03D 13/40 290/55 |
| 2003/0170123 | A1 * | 9/2003 | Heronemus | F03D 1/02 416/41 |
| 2003/0183594 | A1 * | 10/2003 | Torres Martinez | B66C 23/207 212/196 |
| 2005/0218656 | A1 * | 10/2005 | Wobben | F03D 1/02 290/55 |
| 2006/0138782 | A1 * | 6/2006 | Friesth | F03D 1/025 290/55 |
| 2007/0160473 | A1 * | 7/2007 | Arel | F03D 7/0268 416/11 |
| 2008/0093861 | A1 * | 4/2008 | Friesth | F03D 1/025 290/55 |
| 2009/0022030 | A1 | 1/2009 | Aoshima et al. | |
| 2009/0087311 | A1 * | 4/2009 | Wyborn | E04H 12/08 416/9 |
| 2009/0196748 | A1 * | 8/2009 | Salter | F03D 1/02 416/120 |
| 2009/0220308 | A1 * | 9/2009 | Fraenkel | E02B 17/0845 405/227 |
| 2009/0238676 | A1 * | 9/2009 | Marvin | F03D 1/04 415/4.3 |
| 2009/0267038 | A1 * | 10/2009 | Teichert | B66D 1/38 254/335 |
| 2009/0282776 | A1 * | 11/2009 | Berg | E02B 17/0818 52/745.04 |
| 2010/0005731 | A1 * | 1/2010 | Marvin | E04H 12/10 52/40 |
| 2010/0028152 | A1 * | 2/2010 | Numajiri | B66C 1/108 416/146 R |
| 2010/0031589 | A1 * | 2/2010 | Fernald | E02D 27/42 52/173.1 |
| 2010/0083604 | A1 * | 4/2010 | Vangsy | E04H 12/10 52/651.01 |
| 2010/0101086 | A1 * | 4/2010 | Amram | B66C 23/207 29/889.1 |
| 2010/0117368 | A1 * | 5/2010 | Benito | F03D 7/0204 290/55 |
| 2011/0283640 | A1 * | 11/2011 | Miller | E02D 27/42 52/292 |
| 2012/0051939 | A1 * | 3/2012 | Marvin | F03D 1/04 416/244 R |
| 2012/0210668 | A1 * | 8/2012 | Kryger | E04H 7/22 52/645 |
| 2012/0217089 | A1 * | 8/2012 | Fenger | F03D 80/50 182/2.1 |
| 2012/0308338 | A1 * | 12/2012 | Von Ahn | B66C 1/108 414/10 |
| 2013/0106109 | A1 * | 5/2013 | Richert | F03D 7/0208 290/44 |
| 2013/0127173 | A1 * | 5/2013 | Lee | F03D 1/02 290/55 |
| 2013/0318789 | A1 * | 12/2013 | Gabeiras | B21K 3/04 29/889.7 |
| 2014/0186185 | A1 * | 7/2014 | Fox | F03D 1/0658 416/174 |
| 2016/0258418 | A1 * | 9/2016 | Kudsk | F03D 15/00 |
| 2017/0363071 | A1 * | 12/2017 | Baun | F03D 80/82 |
| 2018/0017042 | A1 * | 1/2018 | Baun | F03D 7/0224 |
| 2018/0023543 | A1 * | 1/2018 | Kudsk | F03D 1/02 416/9 |
| 2018/0023544 | A1 * | 1/2018 | Baun | F03D 1/02 416/9 |
| 2018/0180022 | A1 * | 6/2018 | Baun | F03D 7/0264 |
| 2018/0180033 | A1 * | 6/2018 | Baun | F03D 1/02 |
| 2018/0202418 | A1 * | 7/2018 | Baun | F03D 1/02 |
| 2018/0355841 | A1 * | 12/2018 | Baun | F03D 1/02 |
| 2018/0355847 | A1 * | 12/2018 | Baun | F03D 7/0224 |
| 2018/0355850 | A1 * | 12/2018 | Baun | E04H 12/20 |
| 2018/0363622 | A1 * | 12/2018 | Baun | F03D 1/02 |
| 2018/0363631 | A1 * | 12/2018 | Neubauer | F03D 1/02 |

FOREIGN PATENT DOCUMENTS

| | | |
|---|---|---|
| DE | 102012020052 B3 | 4/2014 |
| EP | 1476659 A1 | 11/2004 |
| FR | 1074780 A | 10/1954 |
| GB | 2443886 A | 5/2008 |
| WO | 2004048774 A1 | 6/2004 |

OTHER PUBLICATIONS

European Patent Office, International Search Report and Written Opinion in PCT Serial No. PCT/DK2016/050249, dated Oct. 11, 2016.

(56) References Cited

OTHER PUBLICATIONS

China National Intellectual Property Administration, First Notification of Office Action in CN Application No. 201680048797.X, dated Mar. 5, 2019.
European Patent Office, Examinatiion Report in EP Application No. 16745046.9, dated Jul. 1, 2019.

* cited by examiner

METHODS FOR ERECTING OR DISMANTLING A MULTIROTOR WIND TURBINE

FIELD OF THE INVENTION

The present invention relates to a method for erecting a multirotor wind turbine and to a method for at least partly dismantling a multirotor wind turbine. The methods of the invention allow the multirotor wind turbine to be erected or at least partly dismantled without requiring the use of external crane equipment.

BACKGROUND OF THE INVENTION

Wind turbines normally comprise one or more energy generating units, each energy generating unit comprising a hub carrying one or more wind turbine blades. The wind acts on the wind turbine blades, thereby causing the hub to rotate. The rotational movements of the hub are transferred to a generator, either via a gear arrangement or directly, in the case that the wind turbine is of a so-called direct drive type. In the generator, electrical energy is generated, which may be supplied to a power grid.

Some wind turbines are provided with two or more energy generating units in order to increase the total power produced by the wind turbine, without having to provide the wind turbine with one very large, and therefore heavy, energy generating unit. Such wind turbines are sometimes referred to as 'multirotor wind turbines'.

When erecting or dismantling wind turbines, it is normally necessary to use external crane equipment for erecting the tower and lifting one or more nacelles, hubs, wind turbine blades, etc. to the top of the tower. As the size of wind turbines increases, the size of the crane necessary for performing these operations also increases. It may be very difficult and expensive to rent this kind of crane equipment, and to transfer it to and from the operating site of the wind turbine. In some cases, the costs of renting the crane equipment may even exceed the costs of producing the wind turbine. It is therefore very desirable to avoid the use of external crane equipment for erecting and dismantling wind turbines.

GB 2 443 886 A discloses a wind turbine arrangement comprising a tower and at least two arms projecting outwards therefrom. A wind turbine comprising a rotor and a nacelle is attached to an end of each arm. The nacelles and rotors may be lifted or removed individually by winches mounted temporarily or permanently to the wind turbine structure.

EP 1 476 659 B1 discloses a wind power installation comprising a tower and at least one rotor unit mounted on a support being supported on the tower by a rotary bearing. The support may be rotated into a position in which one of the rotor units is arranged at a lowest possible point, and the rotor unit can be lowered from the support by means of a lowering cable device.

DESCRIPTION OF THE INVENTION

It is an object of embodiments of the invention to provide a method for erecting a multirotor wind turbine in a cost effective manner.

It is a further object of embodiments of the invention to provide a method for at least partly dismantling a multirotor wind turbine in a cost effective manner.

According to a first aspect the invention provides a method for erecting a multirotor wind turbine, the wind turbine comprising a tower structure, at least two energy generating units, each energy generating unit comprising a nacelle and a hub carrying a set of wind turbine blades, and at least one carrier structure, each carrier structure being arranged to carry one or more energy generating units, the method comprising the steps of:

arranging the carrier structure circumferentially with respect to the tower structure, at a lower part of the tower structure, hoisting the carrier structure to an upper part of the tower structure, using a hoisting arrangement, and securing the carrier structure to the tower structure.

The method according to the first aspect of the invention is for erecting a multirotor wind turbine. In the present context the term 'multirotor wind turbine' should be interpreted to mean a wind turbine comprising two or more rotors or energy generating units mounted on one tower structure.

The wind turbine comprises a tower structure, at least two energy generating units, and at least one carrier structure. Each carrier structure is arranged to carry one or more energy generating units, and when the wind turbine has been erected, the carrier structure(s) is/are mounted on the tower structure. Thus, the energy generating units are mounted on the tower structure, via the carrier unit(s).

Each energy generating unit comprises a nacelle and a hub carrying a set of wind turbine blades. The wind turbine blades catch the wind, thereby causing the hub to rotate relative to the nacelle. The rotating movements of the hub are transferred to a generator, either directly or via a gear arrangement. Thereby electrical energy is generated, which may be supplied to a power grid. The nacelle typically accommodates the generator, the gear arrangement and possibly other components which are required in order to transform the rotational movements of the hub into electrical energy. Thus, the energy generating units form the part of the wind turbine which actually transforms the energy of the wind into electrical energy.

According to the method of the first aspect of the invention, the carrier structure is initially arranged circumferentially with respect to the tower structure, at a lower part of the tower structure.

Next, the carrier structure is hoisted to an upper part of the tower structure, using a hoisting arrangement. Thereby the carrier structure is hoisted to a position, in particular to a height, where it is desired to locate the energy generating units. It is an advantage that the carrier structure is hoisted to the upper part of the tower structure by means of a hoisting arrangement instead of by means of an external crane, because the costs of using such a hoisting arrangement are significantly lower than the costs of using an external crane. At least part of the hoisting arrangement may be arranged in or mounted on the wind turbine, temporarily or permanently. Thereby it can be ensured that the hoisting arrangement is available when required.

Finally, the carrier structure is secured to the tower structure, at the upper part of the tower structure.

The step of arranging the carrier structure circumferentially with respect to the tower structure may comprise arranging two or more parts of the carrier structure circumferentially with respect to the tower structure and assembling the two or more parts to form the carrier structure.

According to this embodiment, the carrier structure comprises two or more parts, which are assembled to form the final carrier structure. This allows the carrier structure to be arranged circumferentially with respect to the tower structure, regardless of the size of the tower structure, and regardless of whether or not the entire tower structure has already been erected.

The two or more parts of the carrier structure may, e.g., be assembled by means of a reversible connection, e.g. using screws or bolts. Alternatively, the two or more parts of the carrier structure may be assembled in an irreversible manner, e.g. by means of welding.

As an alternative, the carrier structure may be manufactured in one piece, which is slided onto the tower structure. In this case the carrier structure must be arranged circumferentially with respect to the tower structure before the tower structure has been completely erected. For instance, the tower structure may comprise a number of tower segments, which are assembled to form the tower structure. In this case the carrier structure may be slided onto the first, i.e. the lowermost, tower segment, after this tower segment has been mounted on a foundation structure of the wind turbine, but before the next tower segment is mounted on the first tower segment.

In an embodiment, the step of hoisting the carrier structure to an upper part of the tower structure comprises controlling a gap between an outer surface of the tower structure and an inner surface of the carrier structure, as the carrier structure is hoisted to the upper part of the tower structure. The carrier structure may comprise a ring structure in which case the inner surface of the carrier structure is the inner surface of the ring structure. The outer surface of the tower structure and the inner surface of the carrier structure may preferably match each other such that the gap between the two surfaces can be of approximately the same size around the tower. The gap size may vary as the carrier structure is hoisted. This may for example be the case because of a non-uniform cross section of the tower structure along the length of the tower (for example for tapered wind turbine towers). The gap size may also vary due to local irregularities in the tower surface that the carrying structure needs to pass when hoisted such as for example flanges, surface steps, bolt heads or the like especially near connections or joints of tower sections.

The carrier structure may be of considerable size and weight especially if the carrier structure comprises a yaw arrangement and/or arms extending away from the tower structure for the attachment of energy generating units. It is therefore highly advantageous to control the gap between the carrier structure and the tower during the hoisting in order to control the loads acting on the tower and to prevent any damage to the tower or to the carrier structure.

The importance of being able to control the hoisting of the carrier structure can be underlined by considering some typical and realistic dimensions of modern multirotor wind turbines. The tower is seen to be about 100-180 meters in length with a tower diameter of about 2-4 meters. The energy generating units are positioned on arms of the carrier structure extending 40-50 meters from the tower and the weight of the carrier structure alone (without the weight of the energy generating structures) may be of around 100-150 tons of which the yawing arrangement accounts for around 20 tons.

The controlling of the gap may according to an embodiment comprise arranging a number of spring-loaded rollers and/or sliding pads in the gap. Preferably the rollers or sliding pads are arranged at intervals around the tower, where the intervals are small enough to prevent the carrier structure to come into direct contact with the tower wall. The use of spring-loaded rollers is advantageous in that the rollers roll along the tower surface whereby the carrier structure can be hoisted passed obstructions or unevenness's on the tower surface like welding's, flanges, or bolt heads or the like while maintaining a clearance between the tower and carrier structure and while ensuring a well-controlled and steady hoisting movement of the carrier structure.

Alternatively or additionally to the rollers, spring-loaded sliding pads may be used. The surface of these may be angled to more easily be able to pass tower surface unevenness'.

The number of spring-loaded rollers and/or sliding pads may all be arranged at the same height on the inner surface of the carrier structure or preferably at two or more different heights. Hereby the carrier structure is more efficiently prevented from tilting during hoisting. Hereby the risk of direct contact between the carrier structure and the tower structure is reduced considerably.

According to a further embodiment of the invention, the hoisting arrangement comprises a number of wires attached to the carrier structure. Further, the step of hoisting the carrier structure to an upper part of the tower structure comprises controlling the hoisting by monitoring the wires and adjusting the wires relative to each other, as the carrier structure is hoisted to the upper part of the tower structure. Hereby the hoisting is controlled to avoid contact between the carrier structure and the tower or any undesired motion of the carrier structure during hoisting. Bearing in mind the often considerable weight and dimensions of the carrier structure as well as the difficult working conditions when hoisting a carrier structure up into position, any uncontrolled motion such as tilting or any oscillations should be avoided and could otherwise lead to serious damage as well as safety issues. By adjusting the wires relative to each other, the wires can be adjusted to always ensure that the carrier structure hangs in the desired position and stays as such when hoisted Further, can be ensured that the weight and load is distributed between the wires as intended and desired, for example distributed equally between all wires.

The monitoring and adjusting of the wires comprises monitoring and adjusting a parameter including one or more of the group of wire length, wire tension, wire pulling force, and wire pulling speed. By monitoring, controlling, and adjusting or more of these parameters of one, some or all of the wires is obtained that the carrier structure is hoisted under well-controlled conditions.

In an embodiment, the hoisting arrangement comprises one or more wires extending between the carrier structure and the ground. Hereby, the wires can aid in controlling the positioning of the carrier structure and it movement during the hoisting. This may be especially advantageous if the carrier structure comprises one or more arms extending from the tower making the carrier structure more unstable and more difficult to keep from oscillating. The wires may be attached to a winch placed at or near the ground. The wires may preferably extend to positions some distance away from the tower structure whereby the wires can transfer larger sideways forces to the carrier structure. Some or all of the wires extending between the carrier structure and the ground may be attached to a central portion of the carrier structure and/or closer to the ends of the arms.

The carrier structure may comprise a ring and one or more arms extending away from the ring, and the step of arranging the carrier structure circumferentially with respect to the tower structure may comprise arranging the ring circumferentially with respect to and adjacent to the tower structure, in such a manner that the one or more arms extend away from the tower structure.

According to this embodiment, the ring forms an interface between the tower structure and the carrier structure. The one or more arms may advantageously carry at least some of the energy generating units. Thereby at least some of the energy generating units will be arranged at a distance from the tower structure.

The tower structure may have a conical shape, and the step of hoisting the carrier structure to an upper part of the tower structure may comprise adjusting an inner diameter defined by the carrier structure to match an outer diameter defined by the conical tower structure, as the carrier structure is hoisted to the upper part of the tower structure.

In the case that the tower structure has a conical shape, the outer diameter defined by the tower structure will be smaller at the upper part of the tower structure than at the lower part of the tower structure. Therefore, it is necessary to provide measures which ensure that, on the one hand, the carrier structure fits around the tower structure at the lower part of the tower structure, and, on the other hand, the carrier structure is properly secured to the tower structure at the upper part. This could, e.g., be obtained by designing the carrier structure in such a manner that an inner diameter defined by the carrier structure is adjustable. Thereby a tight fit between the tower structure and the carrier structure can be ensured at the lower part of the tower structure as well as at the upper part of the tower structure. In the case that the inner diameter defined by the carrier structure can be adjusted in a continuous manner, the inner diameter may even by adjusted to match any outer diameter of the tower structure along the length of the tower structure.

In the case that the carrier structure is of the kind comprising a ring and one or more arms, as described above, the adjustable inner diameter may be an inner diameter of the ring. This may, e.g., be obtained by providing the carrier structure with a number of movable pins, which are forced in a radial direction from the carrier structure towards the tower structure when the carrier structure has been hoisted to the operating position, thereby fixing the carrier structure with respect to the tower structure. Alternatively, the ring may be provided with an adjustable cylinder arrangement allowing the diameter and the circumference of the ring to be adjusted.

As an alternative, the tower may have a substantially cylindrical shape. In this case there is no need to adjust an inner diameter defined by the carrier structure, thereby making it simpler to hoist the carrier structure to the upper part of the tower structure.

The tower structure may comprise two or more tower segments, and the method may further comprise the step of erecting the tower structure by assembling the two or more tower segments. The tower segments may be assembled in a reversible manner, e.g. using screws or bolts, or in an irreversible manner, such as by means of welding or the like.

As an alternative, the tower structure may be made from concrete, in which case the tower structure may be formed on site by pouring the wet concrete. The concrete tower structure may subsequently be reinforced by means of wires, e.g. arranged inside the tower structure.

The step of erecting the tower structure may comprise mounting a first tower segment on a foundation structure and subsequently mounting one or more further tower segments on the first tower segment, and the step of arranging the carrier structure circumferentially with respect to the tower structure may be performed after the first tower segment is mounted on the foundation structure and before the two or more further tower segments are mounted on the first tower segment.

According to this embodiment, the first tower segment is initially mounted on the foundation structure, the first tower segment thereby forming a lower part of the tower structure. Then the carrier structure is arranged circumferentially with respect to the first tower segment. Since only the first tower segment has been mounted on the foundation structure at this point in time, it is possible to slide the carrier structure onto the first tower segment from above, thereby allowing the carrier structure to be manufactured in one piece. However, it is not ruled out that the carrier structure could comprise two or more parts being arranged circumferentially with respect to the first tower segment, and subsequently assembled to form the carrier structure, as described above. Once the carrier structure has been arranged circumferentially with respect to the first tower segment, one or more further tower segments are mounted on the first tower segment, one after one, until the tower structure has been completed. The tower segments may also be hoisted using the hoisting arrangement.

The step of hoisting the carrier structure to an upper part of the tower structure may be performed when the step of erecting the tower structure has been completed. According to this embodiment, the carrier structure is hoisted from the lower part of the tower structure to the upper part of the tower structure in one go.

As an alternative, the carrier structure may be hoisted in smaller steps. For instance, each time a tower segment has been added to the tower structure, the carrier structure may be hoisted to a position defined by this tower segment.

The method may further comprise the steps of:
  hoisting the two or more energy generating units to the carrier structure, using the hoisting arrangement, and
  securing the energy generating units to the carrier structure.

According to this embodiment, once the carrier structure has been hoisted to the upper part of the tower structure, and secured to the upper part of the tower structure, the energy generating units are hoisted to the carrier structure and secured thereto. The hoisting of the energy generating units is also performed using the hoisting arrangement, i.e. without the need for an external crane. This is a great advantage.

The step of securing the energy generating units to the carrier structure may, e.g., comprise securing the nacelles of the energy generating units to the carrier structure.

The method may further comprise the step of, for at least one of the energy generating units, assembling the nacelle and the hub, and the step of hoisting the two or more energy generating units to the carrier structure may comprise hoisting the assembled energy generating unit(s), using the hoisting arrangement. According to this embodiment, the nacelle and the hub of at least one energy generating unit are hoisted to the carrier structure in one go. As an alternative, the nacelle, the hub and the wind turbine blades may be hoisted separately, or the nacelle and the hub may be hoisted separately, while at least some of the wind turbine blades are hoisted along with the hub.

The method may further comprise the step of mounting one or more wind turbine blades on the hub of at least one of the energy generating units, prior to hoisting the energy generating units to the carrier structure. According to this embodiment, the nacelle, the hub and at least one wind turbine blade are hoisted in one go, for at least one of the energy generating units. All of the wind turbine blades may be mounted on the hub before hoisting the energy generating unit to the carrier structure. Alternatively, only some of the wind turbine blades may be mounted on the hub before hoisting the energy generating unit, in which case the remaining wind turbine blade(s) is/are hoisted separately after the energy generating unit has been hoisted, and subsequently mounted on the hub.

For instance, in the case that an energy generating unit comprises three wind turbine blades, then at least one of the wind turbine blades will point in a downwards direction, regardless of the rotational position of the hub relative to the nacelle. Therefore at least one of the wind turbine blades will collide with the ground when a fully assembled energy generating unit is arranged at or near the ground. In this case it may be desirable to mount two of the wind turbine blades on the hub and to mount the hub on the nacelle. The hub can then be rotated to a position where the two wind turbine blades point in an upwards direction. This is sometimes referred to as a 'bunny ear' position. The nacelle, the hub and the two wind turbine blades can then be hoisted to the carrier structure in one go. The last wind turbine blade can subsequently be hoisted to the carrier structure and mounted on the hub.

The step of hoisting the energy generating units to the carrier structure may comprise the steps of, for at least one of the energy generating units:
    arranging the energy generating unit in such a manner that the wind turbine blades extend substantially parallel to the ground,
    hoisting the energy generating unit to the carrier structure, using the hoisting arrangement, and
    tilting the energy generating unit to a position in which the wind turbine blades extend substantially perpendicular to the ground.

According to this embodiment, the entire energy generating unit may be assembled before it is hoisted to the carrier structure. In order to avoid that the wind turbine blades collide with the ground, as described above, the entire energy generating unit is arranged with the wind turbine blades extending parallel to the ground. For instance, the blades may be arranged closest to the ground with the hub and the nacelle extending in an upwards direction from the position of the wind turbine blades. The energy generating unit is then hoisted to the carrier structure in this orientation.

Once the energy generating unit has reached the position of the carrier structure, there is no longer a risk of the wind turbine blades colliding with the ground. Therefore the energy generating unit can safely be tilted to an operating position, i.e. to a position in which the wind turbine blades extend substantially perpendicular to the ground, thereby allowing the wind turbine blades to be directed into the wind. Once the energy generating unit has been tilted into the operating position, it is secured to the carrier structure.

As an alternative, the step of hoisting the energy generating units to the carrier structure may comprise the steps of, for at least one of the energy generating units:
    tilting the hub relative to the nacelle to a position in which the wind turbine blades extend substantially parallel to the ground,
    hoisting the energy generating unit to the carrier structure, using the hoisting arrangement,
    tilting the hub relative to the nacelle to a position in which the wind turbine blades extend substantially perpendicular to the ground, and
    mounting the hub rotationally on the nacelle.

This embodiment is similar to the embodiment described above. However, in this case the hub is tilted relative to the nacelle, in order to position the wind turbine blades parallel to the ground, instead of tilting the entire energy generating unit. Accordingly, the nacelle remains in the operating position during the entire process. This allows the nacelle to be secured to the carrier structure before tilting the hub to the operating position.

As an alternative to hoisting the energy generating units to the carrier structure as described above, the energy generating units may be mounted on the carrier structure before the carrier structure is hoisted to the upper part of the tower structure. In this case the energy generating units are hoisted to the upper part of the tower structure along with the carrier structure.

As another alternative, part of the energy generating units may be mounted on the carrier structure and hoisted to the upper part of the tower structure along with the carrier structure. The remaining parts of the energy generating units may then be subsequently hoisted to the carrier structure in a separate manner. For instance, the nacelle may be hoisted along with the carrier structure, while the hub and the wind turbine blades are hoisted separately. Or the nacelle and the hub may be hoisted along with the carrier structure while the wind turbine blades are hoisted separately.

According to one embodiment, the wind turbine may be provided with two or more carrier structures. Furthermore, the tower structure may be provided with supporting guide wires being arranged to stabilise the tower structure, thereby providing a stable tower structure with minimum tower dimensions. In this case the method according to the first aspect of the invention may be performed in the following manner.

Initially, the tower structure, without guide wires, is erected. The two carrier structures are then arranged circumferentially with respect to the tower structure, at a lower part of the tower structure. The carrier structures are arranged immediately adjacent to each other, and one above the other. Then the two carrier structures are hoisted together to the operating position of the lowermost carrier structure, or to a position immediately above a mounting position for the guide wires. The guide wires are then mounted on the tower structure, thereby providing additional stability to the tower structure, before the uppermost carrier structure is hoisted to its operating position. In the case that the mounting position for the guide wires is lower than the operating position of the lowermost carrier structure, the lowermost carrier structure is also hoisted to its operating position after the guide wires have been mounted.

The guide wires may be hoisted along with the carrier structures. For instance, the guide wires may be mounted on the lowermost carrier structure, and may simply be secured to the ground when the lowermost carrier structure reaches its operating position.

According to this embodiment, guide wires can be mounted on the tower structure before the uppermost carrier structure is hoisted to its operating position, thereby introducing substantial loads on the tower structure, while allowing the carrier structures to slide along the tower structure without colliding with the guide wires.

The hoisting arrangement may be a wire winch arrangement. The wire winch arrangement may comprise a number of wires arranged in an appropriate manner inside or along the tower structure, and one or more winches connected to the wires. The wires may be arranged permanently at the wind turbine, while the winch(es) may be movable. Thereby the winch(es) may be used for erecting several wind turbines, e.g. wind turbines forming a wind farm, simply by moving the winch(es) between the relevant wind turbines. This further reduces the costs of erecting the wind turbine. However, the winch(es) may, alternatively, be arranged permanently at the wind turbine.

Alternatively, the hoisting arrangement may be of another kind, such as a hoisting arrangement using a friction wheel, a hydraulically operated hoisting arrangement, or any other suitable kind of hoisting arrangement.

According to a second aspect the invention provides a method for at least partly dismantling a multirotor wind turbine, the wind turbine comprising a tower structure, at least two energy generating units, each energy generating unit comprising a nacelle and a hub carrying a set of wind turbine blades, and at least one carrier structure, each carrier structure being arranged to carry one or more energy generating units, and the carrier structure being arranged circumferentially with respect to the tower structure at an upper part of the tower structure, the method comprising the steps of:
- detaching the carrier structure from the tower structure, and
- lowering the carrier structure to a lower part of the tower structure, using a hoisting arrangement.

It should be noted that a person skilled in the art would readily recognise that any feature described in combination with the first aspect of the invention could also be combined with the second aspect of the invention, and vice versa. The remarks set forth above are therefore equally applicable here.

The wind turbine being dismantled by means of the method according to the second aspect of the invention is of the same kind as the wind turbine being erected by means of the method according to the first aspect of the invention. The remarks set forth above in this regard are therefore equally applicable here.

According to the method of the second aspect of the invention, the carrier structure is initially detached from the upper part of the tower structure. Subsequently, the carrier structure is lowered to the lower part of the tower structure, using a hoisting arrangement. Thus, this may be regarded as a 'reversal' of the method according to the first aspect of the invention.

As described above, it is an advantage that the carrier structure is lowered using a hoisting arrangement, because this allows the wind turbine to be dismantled without requiring the use of an external crane. Thereby the costs of dismantling the wind turbine are reduced.

The method may further comprise the step of lowering one or more of the energy generating units to the ground, using the hoisting arrangement. This is also similar to the embodiments described above with reference to the first aspect of the invention, except that the energy generating units are lowered instead of being hoisted. The energy generating units may advantageously be lowered before the carrier structure is detached from the tower structure and lowered to the ground.

The step of lowering one or more of the energy generating units to the ground may comprise the steps of:
- detaching an energy generating unit from the carrier structure,
- tilting the energy generating unit to a position in which the wind turbine blades extend substantially parallel to the ground, and
- lowering the energy generating unit to the ground, using the hoisting arrangement.

According to this embodiment, the entire energy generating unit, including the nacelle, the hub and the wind turbine blades, are tilted before the energy generating unit is lowered to the ground, thereby bringing the wind turbine blades into a position in which they extend substantially parallel to the ground. Similarly to the situation described above with reference to the first aspect of the invention, the wind turbine blades are thereby prevented from colliding with the ground, and the wind energy unit can still be lowered in one go.

As an alternative, the step of lowering one or more of the energy generating units to the ground may comprise the steps of:
- detaching an energy generating unit from the carrier structure,
- tilting the hub relative to the nacelle to a position in which the wind turbine blades extend substantially parallel to the ground, and
- lowering the energy generating unit to the ground, using the hoisting arrangement.

According to this embodiment, the wind turbine blades are also positioned parallel to the ground, thereby preventing them from colliding with the ground as the energy generating unit is lowered. However, in this case only the hub is tilted, while the nacelle remains in the operating position. The tilting step may be performed either before or after the nacelle is detached from the carrier structure.

As another alternative, at least one of the energy generating units may comprise three wind turbine blades, and the step of lowering one or more energy generating units to the ground may comprise the steps of:
- detaching one wind turbine blade from an energy generating unit,
- lowering the detached wind turbine blade to the ground, using the hoisting arrangement,
- rotating the hub of the energy generating unit to a position in which the remaining two wind turbine blades extend in an upwards direction,
- detaching the energy generating unit from the carrier structure, and
- lowering the energy generating unit to the ground, using the hoisting arrangement.

According to this embodiment, one of the wind turbine blades is initially detached from the energy generating unit, and separately lowered to the ground. Then the hub is rotated to a position, where both of the remaining two wind turbine blades point in an upwards direction, i.e. to a 'bunny ear' position, and the energy generating unit is lowered to the ground. Thereby it is avoided that the wind turbine blades collide with the ground as the energy generating unit is lowered to the ground.

The rotating step could be performed before detaching the wind turbine blade. In this case the hub may be rotated to a position where one of the wind turbine blades extend directly in a downwards direction, while the other two extend upwards, and the wind turbine blade extending directly downwards may be detached and lowered.

As an alternative, all three wind turbine blades may be detached from the hub and lowered, one by one, to the ground before the nacelle and the hub are lowered to the ground.

As an alternative to lowering the energy generating units separately, the energy generating units may be lowered along with the carrier structure, i.e. the carrier structure may be lowered with the energy generating units mounted thereon.

As described above, the hoisting arrangement may be a wire winch arrangement.

BRIEF DESCRIPTION OF THE DRAWINGS

The invention will now be described in further detail with reference to the accompanying drawings in which.

DETAILED DESCRIPTION OF THE DRAWINGS

FIGS. 1-6 illustrate a method for erecting a multirotor wind turbine according to an embodiment of the invention.

Figure 1:
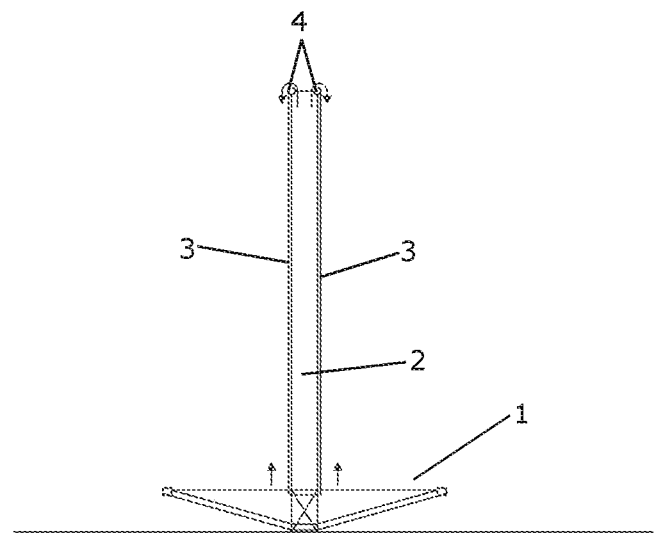
FIGS. 1-6 illustrate a method for erecting a multirotor wind turbine according to an embodiment of the invention.

In FIG. 1 a carrier structure 1 is arranged circumferentially with respect to a tower structure 2, at a lower part of the tower structure 2. A number of wires 3 are attached to the carrier structure 1 and connected to a winch (not shown) via pulleys 4 arranged at the top of the tower structure 2. The wires 3, the winch and the pulleys 4 form a hoisting arrangement allowing the carrier structure 1 to be hoisted along the tower structure 2 to an operating position at an upper part of the tower structure 2, without the need for an external crane. Thereby the costs of erecting the wind turbine are reduced.

Figure 2:
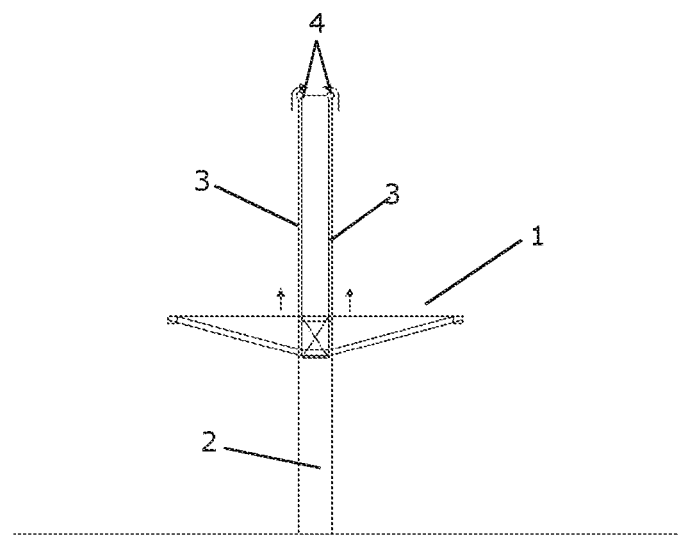

FIG. 2 illustrates the carrier structure 1 being hoisted along the tower structure 2 in the manner described above.

Figure 3:
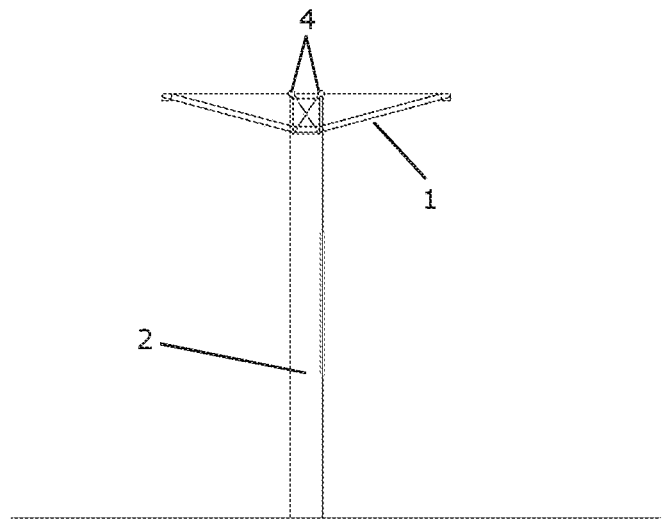

In FIG. 3 the carrier structure 1 has been hoisted to the operating position at the upper part of the tower structure 2. Thus, the hoisting process has been completed, and the carrier structure 1 can be secured to the tower structure 2.

Figure 4:
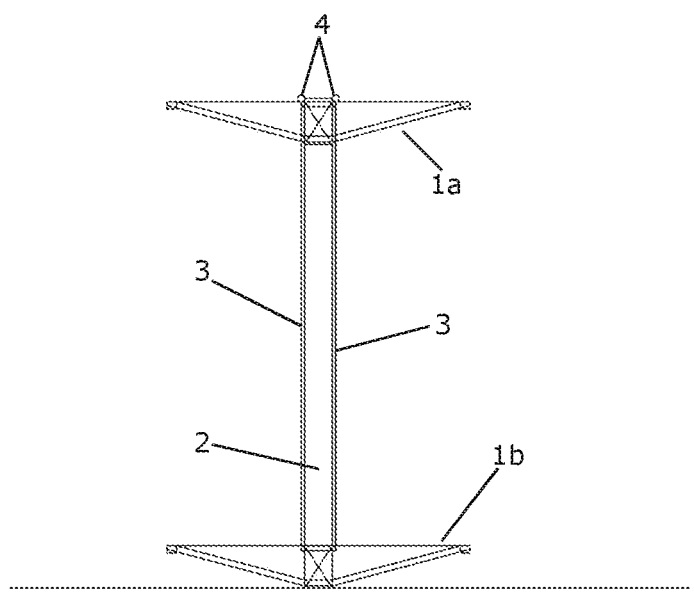

In FIG. 4 an additional carrier structure 1b has been arranged circumferentially with respect to the tower structure 2, in addition to the carrier structure 1a which was hoisted to the upper part of the tower structure 2 as described above with reference to FIGS. 1-3. The wires 3 have now been connected to the additional carrier structure 1b, thereby allowing it to be hoisted to an operating position as well, using the hoisting arrangement.

Figure 5:
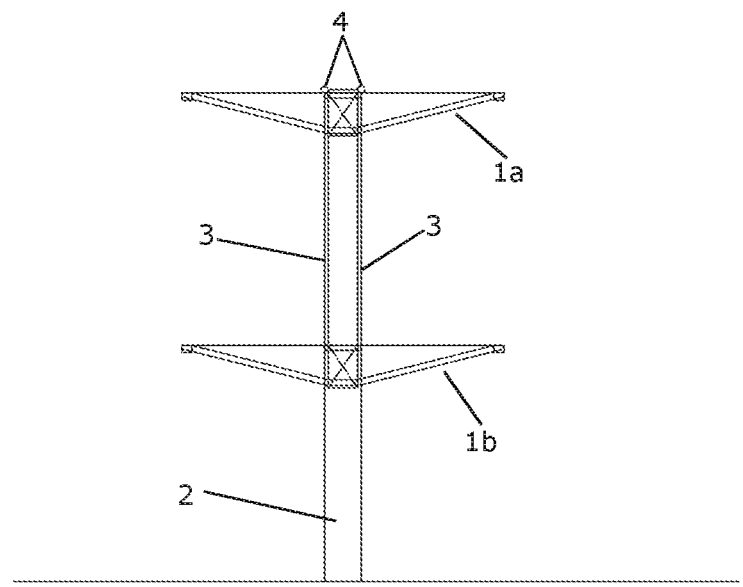

In FIG. 5 the additional carrier structure 1b has been hoisted to the operating position and secured to the tower structure 2. It can be seen that the operating position of the additional carrier structure 1b is somewhat lower than the operating position of the first carrier structure 1a, thereby allowing energy generating units to be mounted on both of the carrier structures 1a, 1b, without the energy units interfering with each other.

Figure 6:
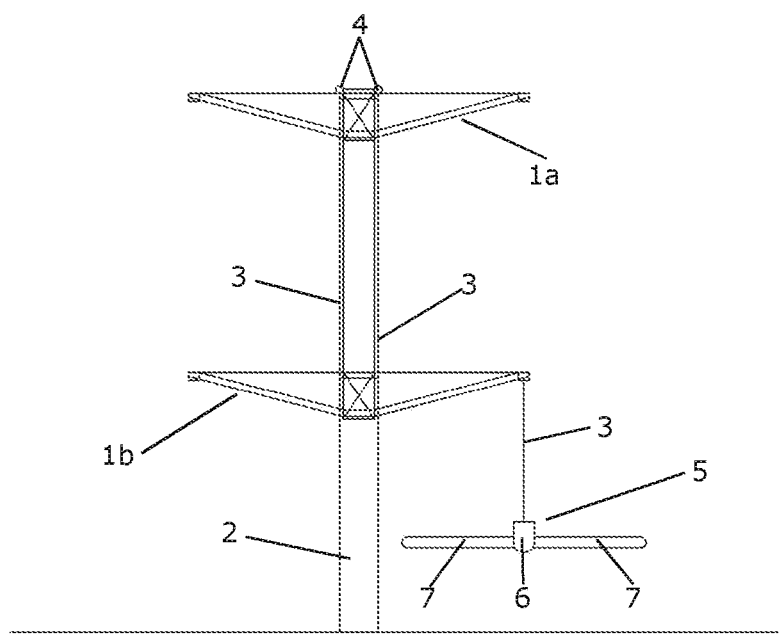

In FIG. 6 one of the wires 3 has been attached to an energy generating unit 5 comprising a nacelle (not shown), a hub 6 and a number of wind turbine blades 7, two of which are shown. Thereby the energy generating unit 5 can be hoisted to the carrier structure 1b using the same hoisting arrangement which was used for hoisting the carrier structures 1a, 1b to their respective operating positions. Accordingly, an external crane is also not required in order to hoist energy generating units 5 to the carrier structures 1a, 1b. In FIG. 6 the energy generating unit 5 is in the process of being hoisted to the carrier structure 1b.

It should be noted that the process described above with reference to FIGS. 1-6 could be reversed, thereby allowing the wind turbine to be at least partly dismantled, using the hoisting arrangement.

Figure 7:
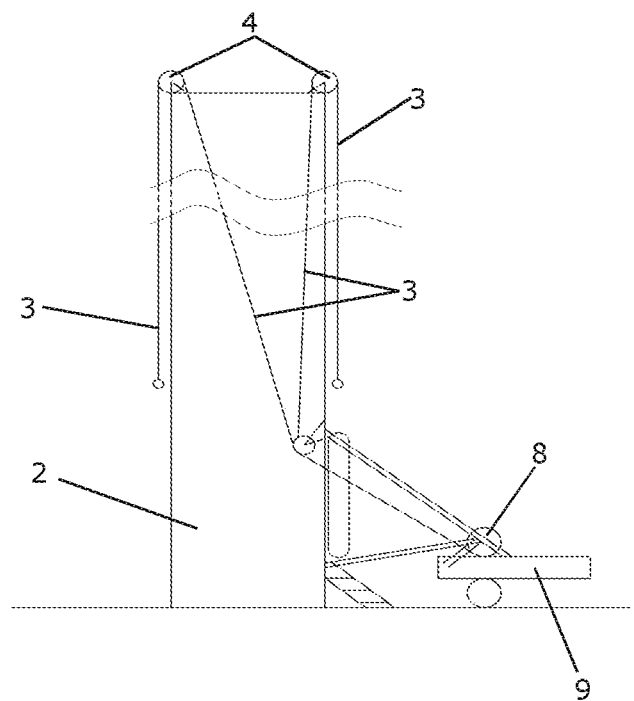
FIG. 7 illustrates the hoisting of a carrier structure in accordance with an embodiment of the invention.

FIG. 7 illustrates a tower structure 2 with a hoisting arrangement including a number of wires 3, two pulleys 4 and a winch 8 connected to the wires 3. Part of the tower structure 2 is not shown for the sake of clarity. The winch 8 is arranged on a transport cart 9. Thereby the winch 8 can be transported between various wind turbines, thereby allowing it to be connected to the wires 3 of a given wind turbine and to be used for hoisting carrier structures 1 and/or energy generating units 5 in order to erect or dismantle that wind turbine. This even further reduces the costs of erecting or dismantling the wind turbine.

Figure 8:
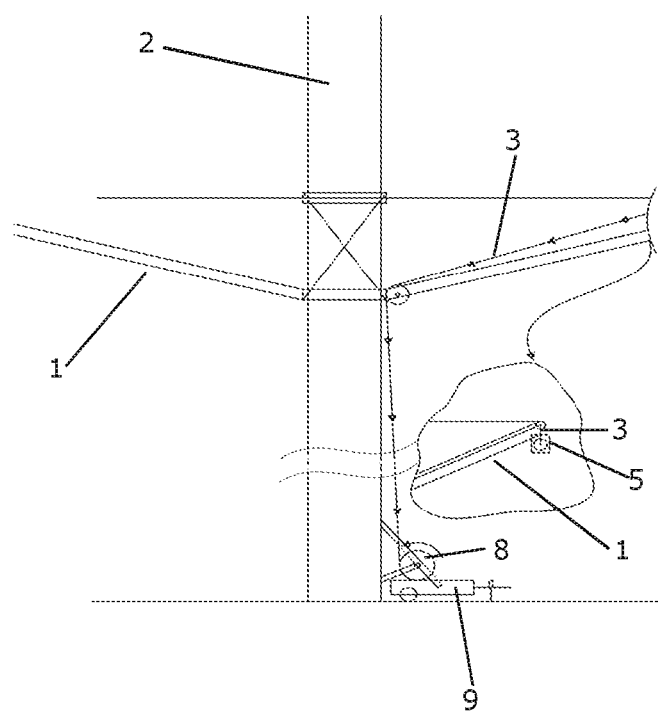
FIG. 8 illustrates hoisting of an energy generating unit in accordance with an embodiment of the invention.

FIG. 8 show how the hoisting arrangement illustrated in FIG. 7 is used for hoisting an energy generating unit 5 to a carrier structure 1 which has already been hoisted to its operating position. One of the wires 3 is attached to the energy generating unit 5 and to the winch 8, and operating the winch 8, as indicated by the arrows, thereby causes to the energy generating unit 5 to be hoisted into position at the carrier structure 1, where it can be secured to the carrier structure 1.

Figure 9:
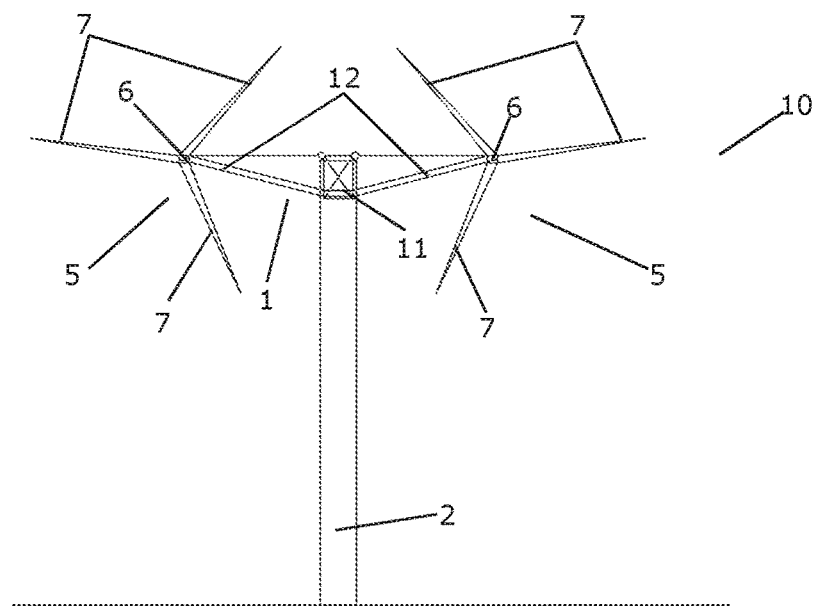
FIG. 9 is a front view of a multirotor wind turbine comprising one carrier structure carrying two energy generating units.

FIG. 9 is a front view of a multirotor wind turbine 10 comprising a tower structure 2 having one carrier structure 1 mounted at an upper part thereof. The carrier structure 1 comprises a ring 11 arranged circumferentially with respect to and adjacent to the tower structure 2, and two arms 12 extending outwardly from the tower structure 2. Each of the arms 12 of the carrier structure 1 carries an energy generating unit 5, each energy generating unit 5 comprising a nacelle (not shown) and a hub 6 carrying three wind turbine blades 7. Thus, the multirotor wind turbine 10 of FIG. 9 comprises a total of two energy generating units 5.

The carrier structure 1 and/or the energy generating units 5 may be hoisted and/or lowered in the manner described above.

Figure 10:
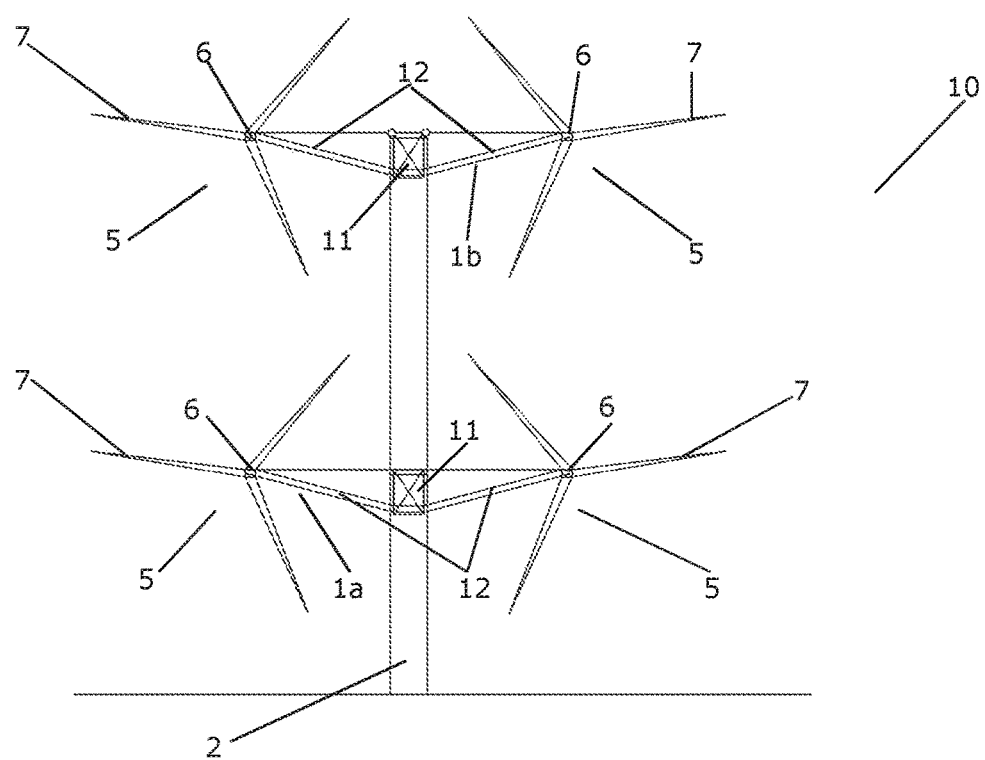
FIG. 10 is a front view of a multirotor wind turbine comprising two carrier structures carrying four energy generating units.

FIG. 10 is a front view of a multirotor wind turbine 10 comprising a tower structure 2 and two carrier structures 1a, 1b mounted thereon in the manner described above with reference to FIGS. 1-6. Each carrier structure 1a, 1b comprises a ring 11 and two arms 12, as described above with reference to FIG. 9, and each arm 12 carries two energy generating units 5. Thus, the multirotor wind turbine 10 of FIG. 10 comprises a total of four energy generating units 5.

Figure 11:
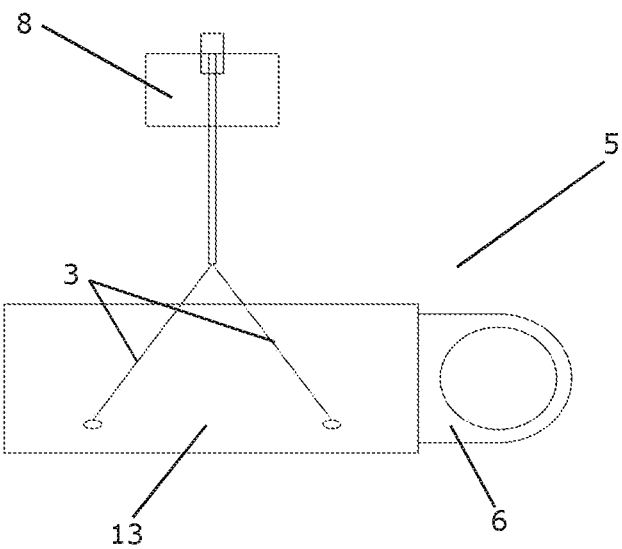
FIGS. 11-15 illustrate hoisting or lowering of energy generating units in accordance with various embodiments of the invention.

FIGS. 11-16 illustrate hoisting or lowering of energy generating units 5 in accordance with various embodiments of the invention. In FIG. 11 an energy generating unit 5 comprising a nacelle 13 and a hub 6 is connected to a winch 8 via a set of wires 3. Thereby the nacelle 13 and the hub 6 are hoisted or lowered together, while the wind turbine blades are hoisted or lowered separately. Thereby an energy generating unit 5 comprising three wind turbine blades can be hoisted or lowered without risking that one of the wind turbine blades collide with the ground.

Figure 12:
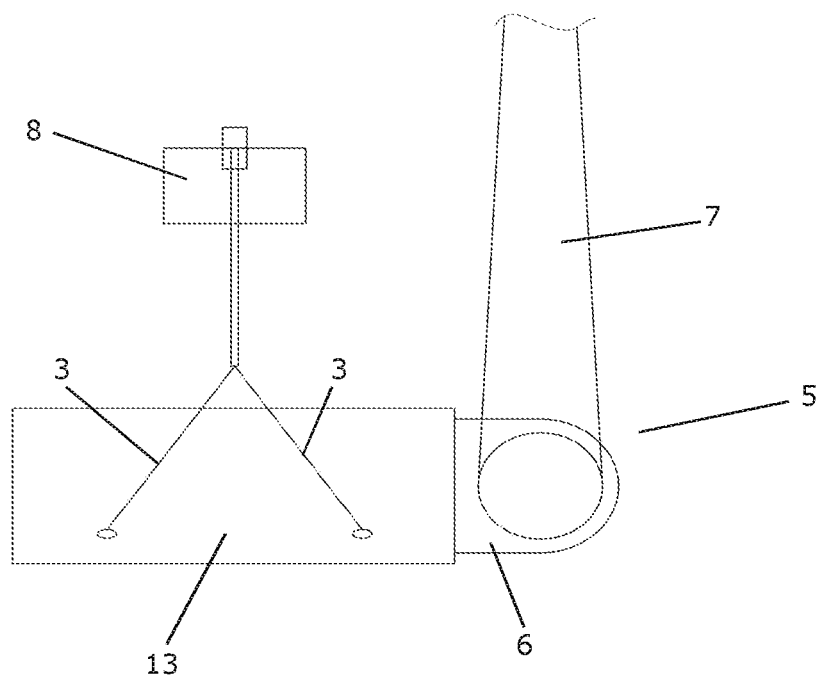

FIG. 12 also shows an energy generating unit 5 connected to a winch 8 via set of wires 3. The energy generating unit 5, in this case, comprises a nacelle 13, a hub 6 and two wind turbine blades 7, one of which is visible, mounted on the hub 6. The hub 6 has been rotated to a position in which the wind turbine blades 7 point in an upwards direction. This is sometimes referred to a as a 'bunny ear' position. Thereby the energy generating unit 5 can be hoisted or lowered without risking that the wind turbine blades 7 collide with the ground. The third wind turbine blade is hoisted or lowered separately.

Figure 13:
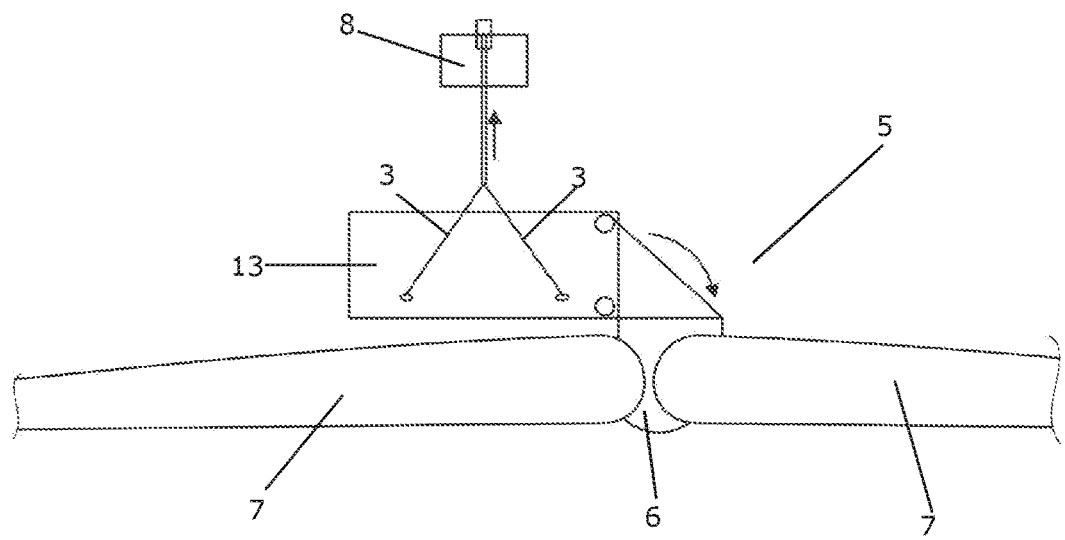

FIG. 13 also shows an energy generating unit 5 connected to a winch 8 via a set of wires 3. The energy generating unit 5 comprises a nacelle 13, a hub 6 and three wind turbine blades 7, two of which are shown. Accordingly, in this case the entire energy generating unit 5 is assembled and can be hoisted or lowered in one go. In order to avoid that one of the wind turbine blades 7 collide with the ground, the hub 6 carrying the wind turbine blades 7 has been tilted relative to the nacelle 13 to a position in which the wind turbine blades 7 extend substantially parallel to the ground.

Figure 14:
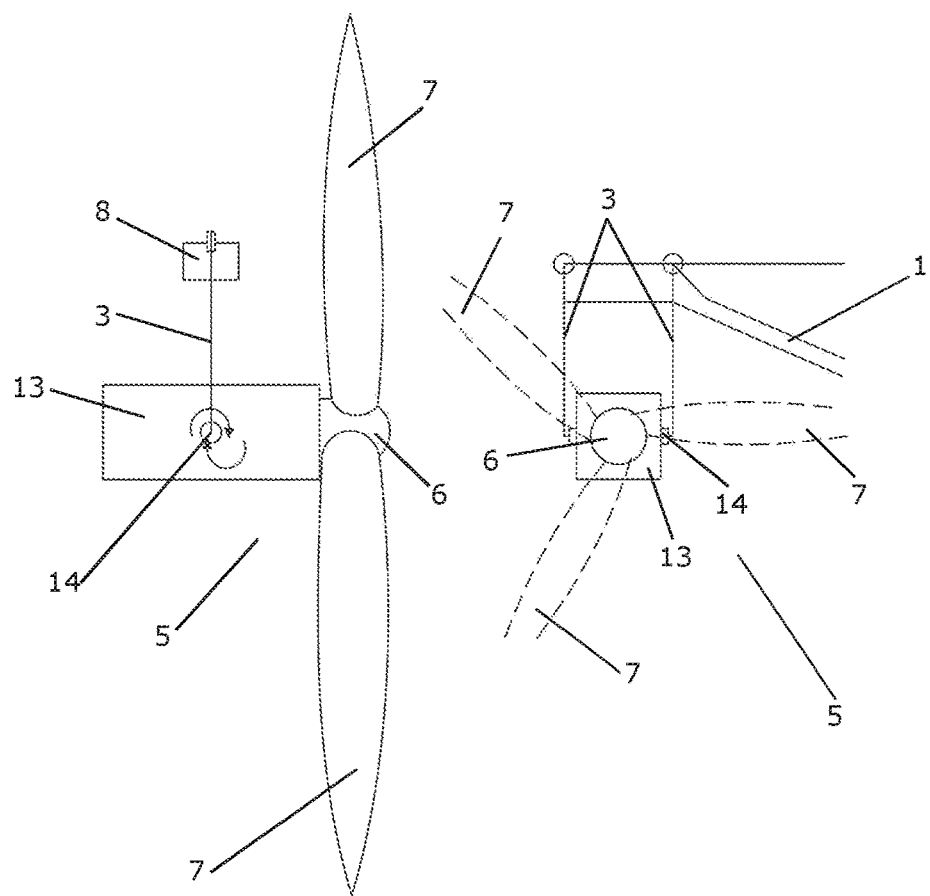
Figure 15:
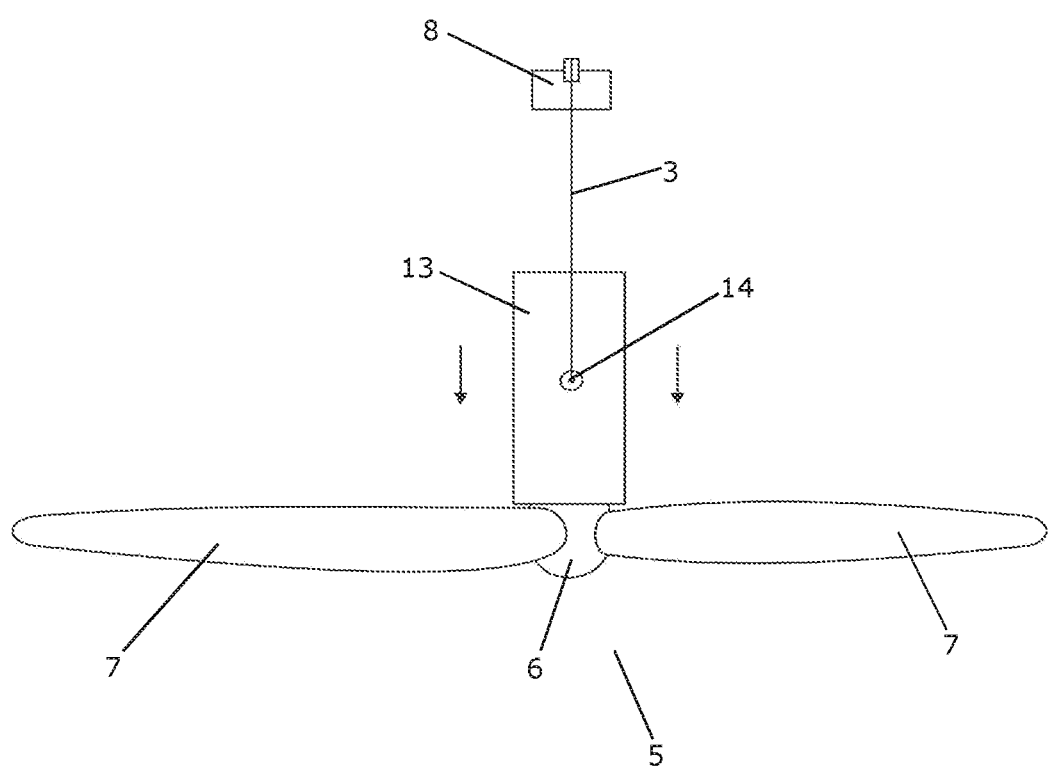

FIGS. 14 and 15 also show an energy generating unit 5 connected to a winch 8 via a set of wires 3. The energy generating unit 5 comprises a nacelle 13, a hub 6 and three wind turbine blades 7. FIG. 14 is a side view and a front view, respectively, of the energy generating unit 5 in an operating position. In FIG. 15 the entire energy generating unit 5, including the nacelle 13, the hub 6 and the wind turbine blades 7, has been tilted about pivot axis 14 to a position in which the wind turbine blades 7 extend along the ground. Thereby the energy generating unit 5 can be hoisted or lowered without risking that the wind turbine blades 7 collide with the ground.

Figure 16:
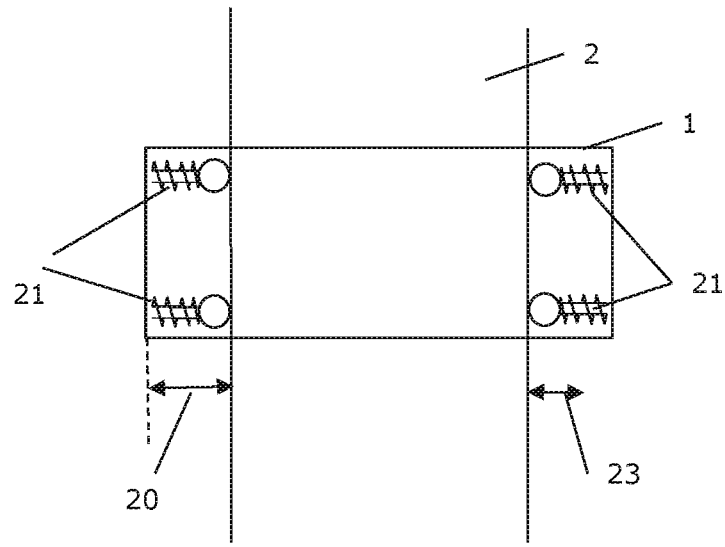
FIGS. 16-18 illustrate hoisting or lowering of the carrier structure in accordance with various embodiments of the invention.
Figure 17:
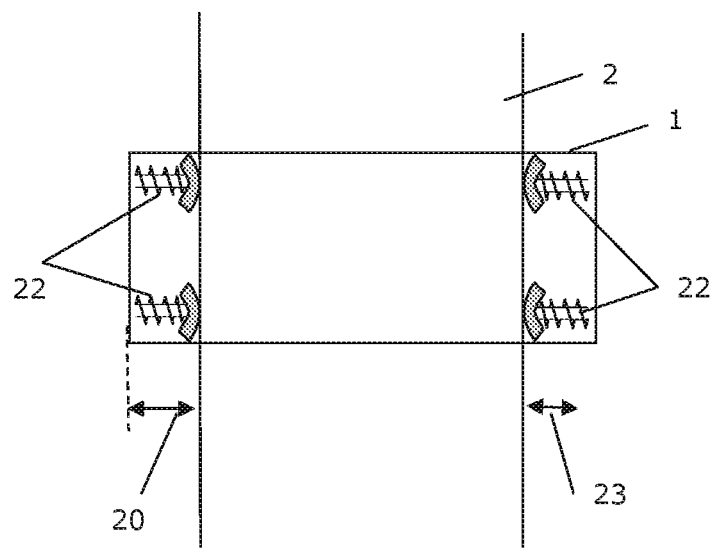

FIGS. 16 and 17 show sketches of how the carrier structure (1) can be hoisted or lowered along the tower structure (2). Here, the carrier structure (1) is simply illustrated by the box but it may attain different shapes, lattice structure etc. The carrier structure may further comprise one or more arms extending from the central portion (not shown). In order to control the hoisting or lowering of the carrier structure, a gap (20) should preferably at all times be present between the carrier structure and the tower during the hoisting and lowering. Hereby direct contact between the carrier structure and the tower is avoided. In FIG. 16, the gap is controlled by a number of spring-loaded rollers (21) placed in the gap (20). In FIG. 17, the same effects are obtained by the use of a number of spring-loaded sliding pads (22). The spring-loaded rollers and/or sliding pads are positioned to allow for some sideways movement of the rollers or pads as indicated by the arrows (23). In this way the carrier structure rolls up (or down) along the tower surface when hoisted (or lowered). Furthermore, the spring-loaded rollers enable the passing over any irregularities or unevenness' on the tower surface along the length of tower without the carrier structure tilting or oscillating. The irregularities or unevenness' on the tower surface may for example be joints between tower sections, flanges, weldings, bolt heads or the like.

Figure 18:
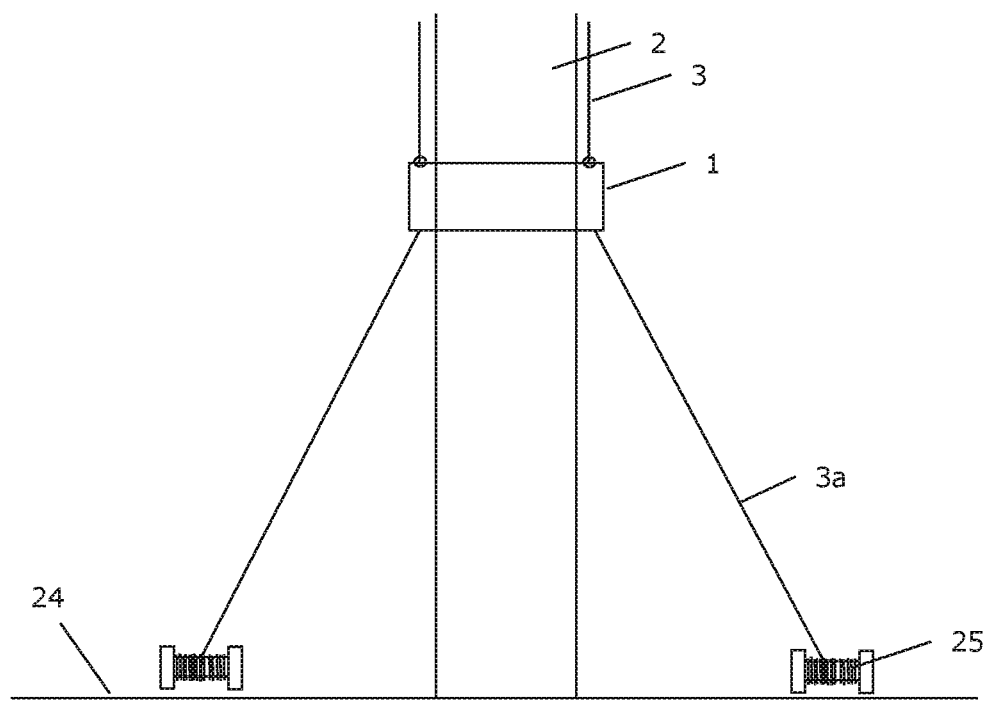

FIG. 18 illustrates the use of a number of additional wires (3a) extending between the carrier structure (1) and the ground (24). These wires are used to provide additional control of the positioning and movement of the carrier structure (1) when hoisted or lowered. The wires (3a) are here attached to winches (25) placed on or near the ground.

The invention claimed is:

1. A method for erecting a multirotor wind turbine, the wind turbine comprising a tower structure, at least two energy generating units, each energy generating unit comprising a nacelle and a hub carrying a set of wind turbine blades, and at least one carrier structure, each carrier structure comprises a ring and one or more arms extending away from the ring, each carrier structure being arranged to carry one or more of the at least two energy generating units at an end of the one or more arms, the method comprising:
arranging the ring of the carrier structure circumferentially with respect to and adjacent to the tower structure in such a manner that the one or more arms extend away from the tower structure, at a lower part of the tower structure,
hoisting the carrier structure to an upper part of the tower structure, using a hoisting arrangement, and
securing the carrier structure to the tower structure,
wherein the carrier structure supports the at least two energy generating units when the at least two energy generating units are generating electrical energy.

2. The method according to claim 1, wherein the step of arranging the carrier structure circumferentially with respect to the tower structure comprises arranging two or more parts of the carrier structure circumferentially with respect to the tower structure and assembling the two or more parts to form the carrier structure.

3. The method according to claim 1, wherein the step of hoisting the carrier structure to an upper part of the tower structure comprises controlling a gap between an outer surface of the tower structure and an inner surface of the carrier structure, as the carrier structure is hoisted to the upper part of the tower structure, so that the inner surface of the carrier structure does not contact the outer surface of the tower structure.

4. The method according to claim 3, wherein the controlling of the gap comprises arranging a number of spring-loaded rollers and/or sliding pads in the gap.

5. The method according to claim 1, wherein the hoisting arrangement comprises a number of wires attached to the carrier structure, and wherein the step of hoisting the carrier structure to an upper part of the tower structure comprises controlling the hoisting by monitoring the wires and adjusting the wires relative to each other, as the carrier structure is hoisted to the upper part of the tower structure.

6. The method according to claim 5, wherein the monitoring and adjusting of the wires comprises monitoring and adjusting a parameter including one or more of the group of wire length, wire tension, wire pulling force, and wire pulling speed.

7. The method according to claim 1, wherein the hoisting arrangement comprises one or more wires extending between the carrier structure and the ground.

8. The method according to claim 1, wherein the tower structure has a conical shape, and wherein the step of hoisting the carrier structure to an upper part of the tower structure comprises adjusting an inner diameter defined by the carrier structure to match an outer diameter defined by the conical tower structure, as the carrier structure is hoisted to the upper part of the tower structure.

9. The method according to claim 1, wherein the tower structure comprises two or more tower segments, and wherein the method further comprises erecting the tower structure by assembling the two or more tower segments.

10. The method according to claim 9, wherein the step of erecting the tower structure comprises mounting a first tower segment on a foundation structure and subsequently mounting one or more further tower segments on the first tower segment, and wherein the step of arranging the carrier structure circumferentially with respect to the tower structure is performed after the first tower segment is mounted on the foundation structure and before the two or more further tower segments are mounted on the first tower segment.

11. The method according to claim 9, wherein the step of hoisting the carrier structure to an upper part of the tower structure is performed when the step of erecting the tower structure has been completed.

12. The method according to claim 1, wherein the hoisting arrangement is a wire winch arrangement.

13. A method for erecting a multirotor wind turbine, the wind turbine comprising a tower structure, at least two energy generating units, each energy generating unit comprising a nacelle and a hub carrying a set of wind turbine blades, and at least one carrier structure, each carrier structure being arranged to carry one or more of the at least two energy generating units, the method comprising:
- arranging the carrier structure circumferentially with respect to the tower structure, at a lower part of the tower structure,
- hoisting the carrier structure to an upper part of the tower structure, using a hoisting arrangement,
- securing the carrier structure to the tower structure,
- hoisting the at least two energy generating units to the carrier structure, using the hoisting arrangement, and
- securing the at least two energy generating units to the carrier structure,
- wherein the carrier structure supports the at least two energy generating units when the at least two energy generating units are generating electrical energy.

14. The method according to claim 13, further comprising, for at least one of the at least two energy generating units, assembling the nacelle and the hub, and wherein the step of hoisting the at least two energy generating units to the carrier structure comprises hoisting the assembled nacelle and hub, using the hoisting arrangement.

15. The method according to claim 14, further comprising mounting one or more wind turbine blades on the hub of at least one of the at least two energy generating units, prior to hoisting the at least two energy generating units to the carrier structure.

16. The method according to claim 15, wherein the step of hoisting the at least two energy generating units to the carrier structure comprises, for at least one of the at least two energy generating units:
- arranging the energy generating unit in such a manner that the wind turbine blades extend substantially parallel to the ground,
- hoisting the energy generating unit to the carrier structure, using the hoisting arrangement, and
- tilting the energy generating unit to a position in which the wind turbine blades extend substantially perpendicular to the ground.

17. The method according to claim 15, wherein the step of hoisting the at least two energy generating units to the carrier structure comprises, for at least one of the at least two energy generating units:
- tilting the hub relative to the nacelle to a position in which the wind turbine blades extend substantially parallel to the ground,
- hoisting the energy generating unit to the carrier structure, using the hoisting arrangement,
- tilting the hub relative to the nacelle to a position in which the wind turbine blades extend substantially perpendicular to the ground, and
- mounting the hub rotationally on the nacelle.

18. A method for at least partly dismantling a multirotor wind turbine, the wind turbine comprising a tower structure, at least two energy generating units, each energy generating unit comprising a nacelle and a hub carrying a set of wind turbine blades, and at least one carrier structure, each carrier structure being arranged to carry one or more of the at least two energy generating units, and the carrier structure being arranged circumferentially with respect to the tower structure at an upper part of the tower structure, the method comprising:
- lowering one or more of the at least two energy generating units to the ground, using a hoisting arrangement,
- detaching the carrier structure from the tower structure, and
- lowering the carrier structure to a lower part of the tower structure, using a hoisting arrangement.

19. The method according to claim 18, wherein the step of lowering one or more of the at least two energy generating units to the ground comprises:
- detaching one or more of the at least two energy generating units from the carrier structure,
- tilting the one or more of the at least two energy generating units to a position in which the wind turbine blades extend substantially parallel to the ground, and
- lowering the one or more of the at least two energy generating units to the ground, using the hoisting arrangement.

20. The method according to claim 18, wherein the step of lowering one or more of the at least two energy generating units to the ground comprises the steps of:
- detaching one or more of the at least two energy generating units from the carrier structure,
- tilting the hub relative to the nacelle to a position in which the wind turbine blades extend substantially parallel to the ground, and
- lowering the one or more of the at least two energy generating units to the ground, using the hoisting arrangement.

21. The method according to claim 18, wherein at least one of the at least two energy generating units comprises three wind turbine blades, and wherein the step of lowering one or more energy generating units to the ground comprises:
- detaching one wind turbine blade from one or more of the at least two energy generating units,
- lowering the detached wind turbine blade to the ground, using the hoisting arrangement,
- rotating the hub of the one or more of the at least two energy generating units to a position in which the remaining two wind turbine blades extend in an upwards direction,
- detaching the one or more of the at least two energy generating units from the carrier structure, and
- lowering the one or more of the at least two energy generating units to the ground, using the hoisting arrangement.

22. The method according to claim 18, wherein the hoisting arrangement is a wire winch arrangement.

23. A method for erecting a multirotor wind turbine, the wind turbine comprising a tower structure, at least two energy generating units, each energy generating unit comprising a nacelle and a hub carrying a set of wind turbine blades, and at least one carrier structure, each carrier structure being arranged to carry one or more of the at least two energy generating units, the method comprising:
- arranging the carrier structure circumferentially with respect to the tower structure, at a lower part of the tower structure,
- hoisting the carrier structure to an operating position of the tower structure, using a hoisting arrangement,
- securing the carrier structure to the tower structure at the operating position,
- hoisting the at least two energy generating units to the carrier structure secured at the operating position, using the hoisting arrangement, and
- securing the at least two energy generating units to the carrier structure, wherein the carrier structure supports the at least two energy generating units when the at least two energy generating units are generating electrical energy.

\* \* \* \* \*